(12) United States Patent
Lee

(10) Patent No.: US 6,694,331 B2
(45) Date of Patent: Feb. 17, 2004

(54) APPARATUS FOR AND METHOD OF SEARCHING AND ORGANIZING INTELLECTUAL PROPERTY INFORMATION UTILIZING A CLASSIFICATION SYSTEM

(75) Inventor: Eugene M. Lee, McLean, VA (US)

(73) Assignee: Knowledge Management Objects, LLC, Arlington, VA (US)

( * ) Notice: Subject to any disclaimer, the term of this patent is extended or adjusted under 35 U.S.C. 154(b) by 0 days.

(21) Appl. No.: 09/875,954

(22) Filed: Jun. 8, 2001

(65) Prior Publication Data

US 2002/0138465 A1 Sep. 26, 2002

Related U.S. Application Data

(63) Continuation of application No. 09/875,943, filed on Jun. 8, 2001, and a continuation of application No. 09/875,937, filed on Jun. 8, 2001.
(60) Provisional application No. 60/277,282, filed on Mar. 21, 2001.

(51) Int. Cl.⁷ .............................................. G06F 17/30
(52) U.S. Cl. ........................... 707/104.1; 707/10; 707/3
(58) Field of Search ................................ 707/1, 2, 3, 4, 707/5, 100, 104.1, 30, 14; 709/224; 717/174

(56) References Cited

U.S. PATENT DOCUMENTS 5,991,751 A * 11/1999 Rivette et al. .................. 707/1
6,606,744 B1 * 8/2003 Mikurak ....................... 717/174

OTHER PUBLICATIONS

"Patent Examiner's Reference Tools User's Guide" (USPTO Publication, Office of the CIO, Version 2.0, Apr. 1999).*

"Patent Examiner's Search Tools User's Guide" (USPTO Publication, Office of the CIO, Version 2.0, Aug. 1999).*

Thomson–Derwent web site (www.derwent.com).*

* cited by examiner

*Primary Examiner*—Diane D. Mizrahi
(74) *Attorney, Agent, or Firm*—Hale and Dorr LLP

(57) ABSTRACT

An apparatus for and a method of searching and organizing intellectual property (IP) is provided. In accordance with a preferred embodiment of the invention, an apparatus (and corresponding method) is provided for formulating and facilitating searches for intellectual property, and organizing results of such searches. In an exemplary embodiment, a search and organization server is provided with one or more modules to create and process search queries to be run on local or remote database systems. A class search module, for example, may be provided to provide on-line access to classification information and facilitate searching of intellectual property using select classifications. An IP thesaurus module may be provided for developing a list of elements (e.g., words, textual phrases, concepts, representations, numbers, identifications, pictures, graphics, features, etc.) found in select intellectual property information (e.g., groupings of patents). In accordance with an exemplary embodiment, the list of elements may be used as an aid in learning a new technology, as a search tool to refine search queries or criteria, as a drafting tool to assist in the preparation of technical or legal documents (e.g., proposals, licenses, patent applications, etc.), or any other practical use. A field-of-search module may be provided to creation of a field-of-search based on search information identified from select intellectual property information. Additional modules (e.g., search engine, workspace module, alert generator, report generator, etc.) may be provided in the search server to formulate, store, organize and output results achieved through operation of the search server.

71 Claims, 5 Drawing Sheets

APPARATUS FOR AND METHOD OF SEARCHING AND ORGANIZING INTELLECTUAL PROPERTY INFORMATION UTILIZING A CLASSIFICATION SYSTEM

This application derives from and claims the benefit of U.S. Provisional Patent Application No. 60/277,282, filed Mar. 21, 2001, which is hereby incorporated by reference in its entirety. This is also a continuation of co-pending U.S. patent application Ser. No. 09/875,943, filed on Jun. 8, 2001, and Ser. No. 09/875,937, filed on Jun. 8, 2001, which are both incorporated herein by reference in their entireties.

BACKGROUND

Intellectual property (IP) professionals such as patent attorneys, agents, law firms, search firms, corporate IP departments, technology transfer managers, asset-based lenders, and the like perform laborious tasks of searching for, retrieving, analyzing, and organizing various forms of IP, including patents, trademarks, copyrights, and trade secrets.

Known subscription-based and non-subscription-based search systems provide IP professionals with basic search and retrieval functions. Database hardware and software have been developed for access by IP professionals and other users through personal computers, mainframes, and other processor-based devices. Users may access and view IP information stored locally on CD-ROMs, stored on network storage devices through a local area network, or stored on remote database systems through one or more disparate network paths (e.g., the Internet).

Electronic searching for intellectual property information has effectively become the preferred searching vehicle given the vast amount of information available, the complexity of the information, the geographical limitations posed, and the technically adeptness of the majority of IP professionals. The known electronic searching systems, however, provide nothing more than rudimentary searching functions that require the IP professionals to formulate the content and direction of their search strategy through previous experience or trial-and-error. The systems are unable to facilitate or automate the creation of search queries and criteria. Nor do the known systems provide for the efficient retrieval, retention, and organization of IP information sought or resulting from the searching process.

SUMMARY

An apparatus for and a method of searching and organizing intellectual property (IP) is provided. In accordance with a preferred embodiment of the invention, an apparatus (and corresponding method) is provided for formulating and facilitating searches for intellectual property, and organizing results of such searches. In an exemplary embodiment, a search and organization server is provided with one or more modules to create and process search queries to be run on local or remote database systems. A class search module, for example, may be provided to provide on-line access to classification information and facilitate searching of intellectual property information using select classifications. An IP thesaurus module may be provided for developing a list of elements (e.g., words, textual phrases, concepts, representations, numbers, identifications, pictures, graphics, features, etc.) found in select intellectual property information (e.g., groupings of patents). In accordance with an exemplary embodiment, the list of elements may be used as an aid in learning a new technology, as a search tool to refine search queries or criteria, as a drafting tool to assist in the preparation of technical or legal documents (e.g., proposals, licenses, patent applications, etc.), or any other practical use. A field-of-search module may be provided to create a field-of-search based on search information identified from select intellectual property information. Additional modules (e.g., search engine, workspace module, alert generator, report generator, etc.) may be provided in the search server to formulate, store, organize and output results achieved through operation of the search server.

DETAILED DESCRIPTION

Preferred embodiments and applications of the invention will now be described. Other embodiments may be realized and structural or logical changes may be made to the disclosed embodiments without departing from the spirit or scope of the invention. Although the preferred embodiments disclosed herein have been particularly described as applied to an apparatus for (and method of) searching and organizing intellectual property in the form of patents, it should be readily apparent that the invention may be embodied to implement any searching or organizing system (or method) having the same or similar problems.

Figure 1:
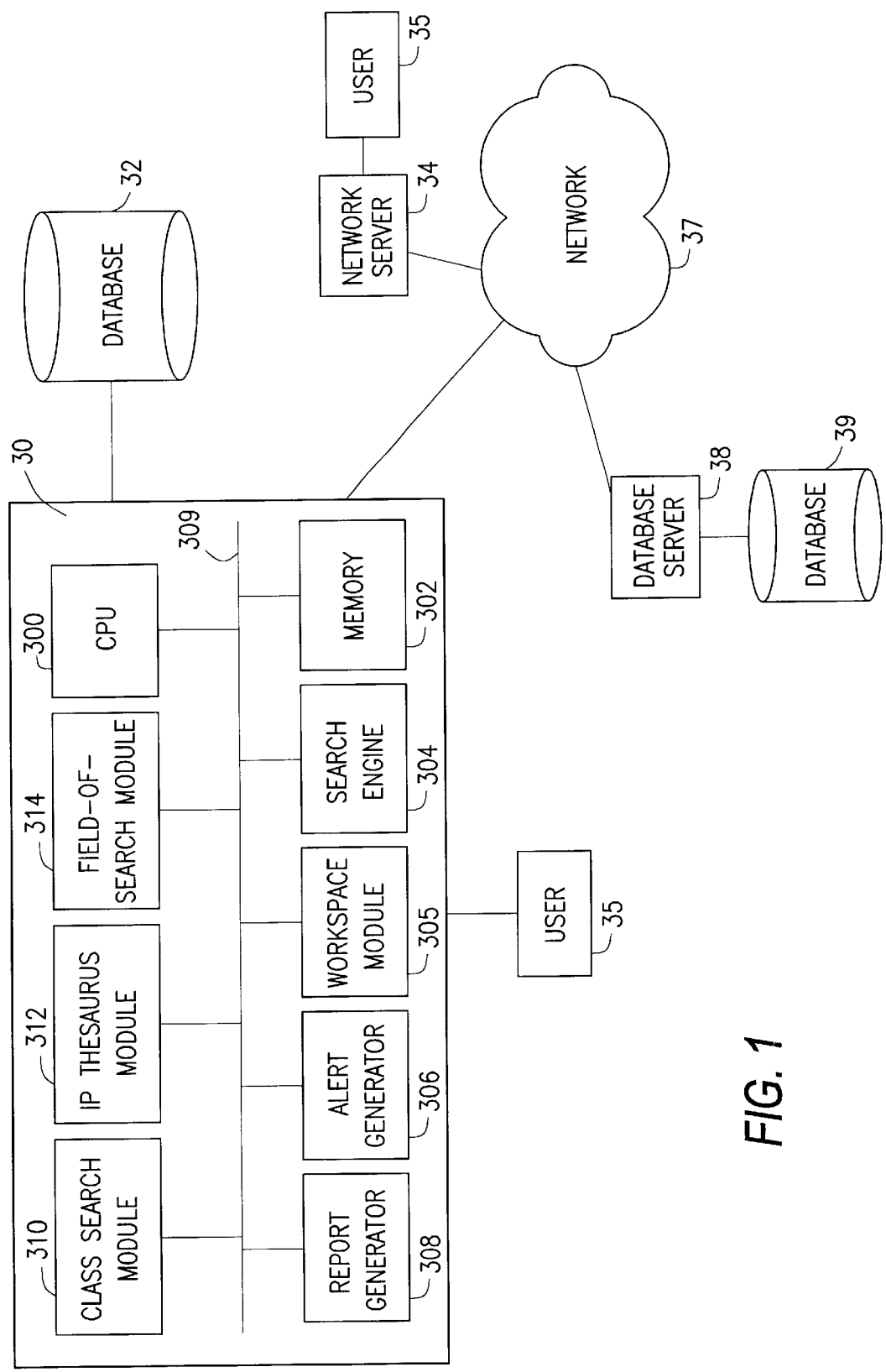
FIG. 1 illustrates a system architecture in accordance with a preferred embodiment of the invention.

An exemplary system architecture in accordance with a preferred embodiment of the invention is illustrated in FIG. 1. The exemplary system architecture may be used to effectuate any one or more aspects of the searching and organizing operations described in (and apparent from) the specific embodiments, implementations, and illustrations provided herein.

Some of the many system components that may be employed in the architecture include: one or more searching and organizing servers (symbolically depicted as "SO server 30"); one or more database units (symbolically depicted as "database 32"); one or more remote database or other storage units (symbolically depicted as "database 39"); one or more networks (symbolically depicted as "network 37"); and one or more users (symbolically depicted as "user or user interface 35"), as will be described in more detail below.

In accordance with a preferred embodiment, SO server 30 may include one or more central processing units (CPUs) symbolically represented by CPU 300 used to provide processing of input/output data between SO server 30, user interface 35, and/or network 37, and among the different modules (all connected together via system bus 309) within SO server 30. CPU 300, which may be any known processor or processor-based system, typically executes one or more executable instructions or programs stored in the one or more (local or remote) memory devices (or other articles of manufacture) symbolically represented as memory module 302. Individual control modules (e.g., search engine 304, workspace module 305, alert generator 306, report generator 308, class search module 310, IP thesaurus module 312, and field-of-search module 314) may be provided to control processing of the individual searching and/or organizing operations described in (or apparent from) the instant disclosure, as will be described in detail below. The individual control modules may themselves be processors or processor-based systems executing one or more executable programs (locally or remotely) stored in a memory component (or other article of manufacture).

User interface 35 may include one or more display devices (e.g., CRT, LCD, or other known displays) or other output devices (e.g., printer, etc.), and one or more input devices (e.g., keyboard, mouse, stylus, touch screen interface, or other known input mechanisms) for facilitating interaction of a user with the system via user interface 35. As illustrated, user interface 35 may be directly coupled to SO server 30, or indirectly coupled to SO server 30 through one or more interfacing modules (e.g., network server 34) and one or more direct or indirect transmission paths (e.g., symbolically represented as "network 37").

Network 37 may take any wired/wireless form of known connective technology (e.g., corporate or individual LAN, enterprise WAN, intranet, Internet, Virtual Private Network (VPN), combinations of network systems, etc.) to allow SO server 30 to provide local/remote information and control data to/from other locations (e.g., remote database server 38/remote database 39, network server 34/user interface 35, etc.). In accordance with a preferred embodiment of the invention, SO server 30 may be implemented in stand-alone or network devices, as well as serving one or more users over a collection of remote and disparate networks (e.g., Internet, intranet, VPN, etc.).

In accordance with a preferred embodiment of the invention, information related to intellectual property is stored in database 32 and/or in one or more remote database systems (e.g., database 39). (For simplicity, reference is made herein only to database 32, although it should be readily apparent that one or more supplementary or alternative storage devices (e.g., remote database 39) may be employed in lieu of (or in combination with database 32) for any given implementation of the invention.) In this exemplary embodiment, the stored intellectual property information is related to patents, including text and images of U.S., foreign, international, or multi-national patent publications (e.g., issued patents or equivalents, published patent applications, statutory invention registrations, abstracts, etc.), including Japanese, Patent Cooperation Treaty (PCT), and European Convention patent publications, as well as other related information (e.g., technical publications, sequence listings, file histories, government records, public notices, etc.) that may be associated or otherwise pertinent to such patent publications. The different information may be stored as a continuous set of data, segmented to form a contiguous whole, or separated into different segments to reside in and among one or more server databases, as well as partitioned for storage in one or more files to achieve efficiencies in storage, access, and processing of data.

The stored intellectual property information may be stored in one or more database structures for use in their raw, natural, or unmodified data states (e.g., as delivered from the data source). In accordance with a preferred embodiment, at least some portion of the information may be modified prior to storage in database 32. For example, the printed patents and published applications may be marked up using Extensible Markup Language (XML) prior to storage in database 32. The XML-based information can be easily transformed by the system or user into a variety of formats, including document types such as PDF, RTF, TIF, HTML, as well as interfaces understood by diverse components such as wireless and handheld devices.

Search engine 304 is provided (alone or in conjunction with other modules) to control the search and retrieval of intellectual property information stored in database 32 based on search criteria or queries formulated in SO server 30 (e.g., by modules 310, 312, 314, etc.) and/or by user 35. Search engine 304 may provide text-based, graphics-based, code-based, or other search/query mechanisms to produce search results to be viewed, accessed, or otherwise output from SO server 30 (e.g., to user 35). In an exemplary embodiment, for example, search engine 304 performs searches based on input data such as: identification numbers (e.g., patent number); keywords; text or graphics in select fields (e.g., different segments or information fields of documents such as Publication Number, Publication Date, Title, Inventor, Assignee, Application Number, Filing Date, Related Data, Priority Data, International Classification, U.S. Classification, Cross-Reference Classification, Field of Search, References Cited, Forward References Citing Document, Examiner, Agent, Abstract, Background, Field of Invention, Summary, Brief Description of Drawings, Detailed Description, claims, Drawings, etc.); Boolean logic characters, or other search criteria (e.g., date restrictions, etc.).

Results of the search or query are compiled for storage, display, or other output (e.g., to user 35). The results may include a list of intellectual property (e.g., issued patents) or other information corresponding to the search criteria or query developed by (or input to) SO server 30. The information listed may link to underlying data (e.g., patent images, text, etc.) stored locally or remotely in database 32, may be links to resources on remote storage systems (e.g., U.S. Patent and Trademark Office database, Web site of commercial database provider, etc.) accessible over an external network (e.g., network 37), or may be other links or data identifying a location or resource (on or off-line) of information (e.g., name of printed publication, name/address of publisher, or identity of thesis cataloged in library, etc.) corresponding to the search criteria or query. Search engine 304 is programmed to permit editing or refinement of the search criteria or query to perform additional searches on different data sets or the data set produced from the initial search results.

SO server 30 makes the search results (and any available underlying documents listed) available for viewing or other output (e.g., print, e-mail, fax, etc.) by user 35 (or other systems). In a preferred embodiment, the search results are presented as an ordered list. The search results may be ordered, sorted, and reordered in accordance with one or more known order preferences set by a user (e.g., date, alphabetical by title, inventor, assignee, relevancy, weighted relevancy, scoring formula, etc.).

In accordance with a preferred embodiment, the resulting information (i.e., results and/or available underlying documents) may be downloaded in one or more textual/ graphical formats (e.g., RTF, PDF, TIFF, etc.), or set for alternative delivery to one or more specified locations (e.g., via e-mail, fax, regular mail, courier, etc.) in any desired format (e.g., print, storage on electronic media such as CD-ROM, etc.). SO server 30 is programmed to allow users, that are viewing the search results and underlying documents on user interface 35, to view one or more documents on the same display, as well as view one or more portions or segments or information fields of different documents (e.g., abstract, drawings, claims, etc.) simultaneously so as to facilitate analysis of the search results.

In accordance with a preferred embodiment, the individual items or documents listed in the search results, as well as the underlying documents themselves, may include one or more specific references, data fields, links, or other indications of subsequent history of the item or document. The subsequent history information when used in connection with patent information, for example, may refer to the existence of pending or completed reexamination, reissue, opposition, arbitration, litigation, or other proceedings. Where documentation of the subsequent history (e.g., reexamination certificate, file history, complaint, notice, etc.) is available (e.g., from database 32, remote database 39, etc.), links or other identification of the resource location of the documentation may be included in the subsequent history information to allow the documentation to be easily accessed, retrieved, and/or output for use (e.g., viewing, printing, etc.) by user 35 or the like. The subsequent history information may be acquired by (or provided to) SO server 30 periodically (e.g., during database updates) for inclusion (e.g., in a subsequent history data field, etc.) with respective items or documents within the data domain of SO server 30.

A specialized subsequent history field that may be included is referred to herein as a "Forward Reference" field that is associated with an underlying item or document. The Forward Reference field provides information regarding subsequent items or documents (e.g., patents, publications, notices, etc.) that have cited or otherwise made reference to the underlying item or document.

Search results, the underlying documents listed in the search results, as well as the search criteria itself may be saved (in local or remote memory units). In a preferred embodiment, users are provided with dedicated workspace areas in which to save, edit and organize saved search results, resulting documents, and search criteria. Workspace module 305 is provided (alone or in conjunction with other modules) to facilitate and control use of the workspace areas by individuals or groups of individuals. Workspace module 305 permits the creation and naming of portfolios or other folder mechanisms that may be useful in the retention and organization of the saved information. Select documents, search results, and search criteria may be moved into different folders for storage and organization purposes. The folders may be organized into different hierarchical arrangements where desired. Users are permitted to annotate individual documents, search results, criteria, as well as folders with notes, comments, and identification data for their own use or group usage. The annotations may themselves include the introduction, importation or link (e.g., URLs) to a variety of information, including documents, images, video, multimedia content, and other data available or stored locally or remotely through the network.

Alert generator 306 may be used (alone or in conjunction with other modules) to access saved searches (stored in either a user's workspace, or in any other memory unit) and automatically update the searches upon a lapse of a predetermined period (e.g., daily, weekly, monthly, etc.), or upon occurrence of a predetermined event (e.g., database update, etc.). A user requesting that a saved search be automatically updated, can specify how the user is to be alerted of any changes in the search results. Alert generator 306, for example, can be programmed to provide an alert (e.g., containing the new search results) to a user by sending an email message, voice mail message, pager message, facsimile message, regular mail message, or other mechanism (or combination of such mechanisms) specified by the user. The update search can be performed on only portions (e.g., updated data) of the database or the entire database.

Report generator 308 may be provided for use (alone or in conjunction with other modules) in providing reports identifying search criteria, search results, or other pertinent information as customized by a user. Report generator 308, for example, may be programmed to allow users to create and store templates or other forms to be populated during report generation. Reports may then be generated manually or automatically from selected data sets (e.g., identified search results, select documents, etc.), or from contents of one or more workspace folders. Portfolios in a user's workspace storing intellectual property of a given company, for example, can be used to generate reports of the company holdings using a customized template.

Figure 2:
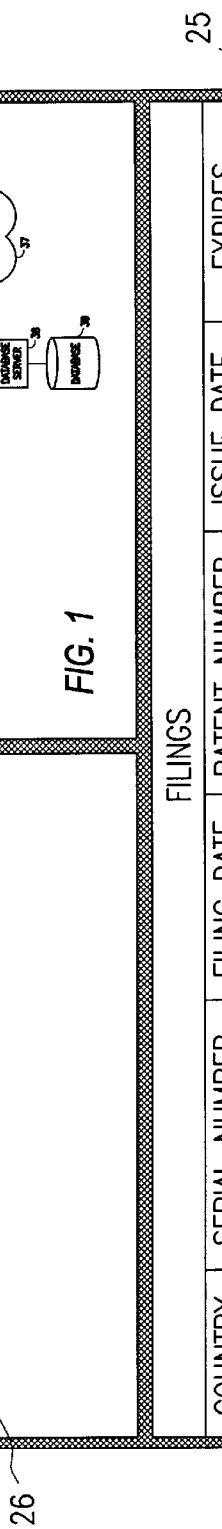
FIG. 2 illustrates a report template created in accordance with a preferred embodiment of the invention.

The template may include any textual or graphical content stored or otherwise referenced in the portfolio (or in any other local or remote memory unit) for retrieval and placement in the report as dictated by the customized template. In an exemplary embodiment illustrated in FIG. 2, a company logo 20, is retrieved from storage (e.g., in the portfolio folder, database 32, remote database 39, etc.) and positioned in the upper left-hand corner of the report, as dictated by the template. In this exemplary embodiment, the intellectual property information stored in the portfolio pertains to the company patent holdings, and the template has been customized to include only specific portions of each patent. Thus, for each patent stored or otherwise referenced in the workspace portfolio, the patent title 21, docket number 22, inventor name 23, drawing FIG. 24, filing data 25, and abstract 26 are printed in their respective positions as dictated by the customized template.

In accordance with a preferred embodiment of the invention, class search module 310 (FIG. 1) is provided to implement (alone or in conjunction with other modules) a search system for use with one or more classification systems (e.g., U.S. Patent and Trademark Office classification of patents, classification of goods and services for trademarks, U.S. Copyright Office classification of copyrighted works, etc.). During a user search, class search module 310 is programmed to gain access to underlying data of a classification system from database 32 (and/or any other accessible remote system having some or all of the underlying data). Class search module 310 may output the underlying data, for example, as a display on user interface 35. In an exemplary embodiment, the underlying data may be displayed as an on-line classification index for on-line access to a list of subject headings referring to specific classifications made in the classification system. The display may further include an on-line classification manual for on-line access to a list of class titles in the classification system, as well as on-line classification definitions for on-line access to explanations and illustrations of subject matter classified in each classification.

Figure 3:
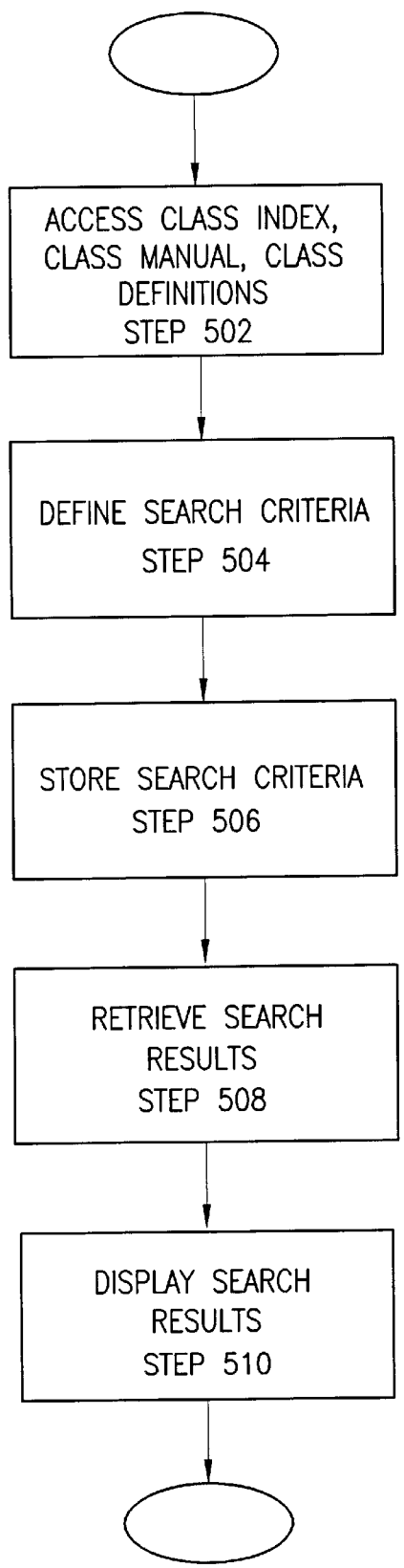
FIG. 3 illustrates an exemplary method of class searching in accordance with a preferred embodiment of the invention.

In accordance with a preferred embodiment, class search module 310 is programmed to effectuate the operational steps illustrated in FIG. 3 and described below. A user performing a desired search is given access to and able to review the different subject headings, titles, and definitions in the classification system to locate and select the most pertinent classifications (step 502). Class search module 310 receives input data from user interface 35 regarding one or more classifications selected by the user. The classifications selected may be implemented in a variety of forms. The classifications may include, for example, "current classification," "current cross-reference classification," respectively directed to the current primary and secondary classifications (e.g., class\subclass) assigned to intellectual property information to be searched, as well as the "former," "original," or other classification and cross-reference classification data of the information (e.g., at time of publication of the information). The different forms of classification data available (e.g., "classification," "cross-reference classification," etc.) may be selected individually, in combinations, or all at once, as desired by a user.

The selected classifications are used to define search criteria to be used in searching database 32 for desired intellectual property information (step 504). The search criteria as defined is stored in a user accessible storage bank (step 506). The search criteria stored in the storage bank may be output by class search module 310 to be displayed, edited (e.g., classifications added or deleted), or further refined at user interface 35. The stored search criteria is transmitted by class search module 310 itself or other modules (e.g., search engine) to database 32 for execution so as to identify any intellectual property information corresponding to the search criteria. Any intellectual property information corresponding to the search criteria is retrieved (step 508) by class search module 310 (or other modules) for subsequent processing. The search results may be output to the user in any known fashion, including display on user interface 35 (step 510), and stored in a user workspace, if desired. Preferably, the search results are displayed as a list of intellectual property information having the same or similar form as that described above in connection with the search results produced from search engine 304. The listed information may thus be links to underlying intellectual property information (e.g., patent images, text, etc.) stored locally or remotely in database 32, links to resources on remote storage systems (e.g., U.S. Patent and Trademark Office database, Web site of commercial database provider, etc.) accessible over an external network (e.g., network 37), or other links or data identifying a location or resource (on or off-line) of information (e.g., name of printed publication, name/address of publisher, or identity of thesis cataloged in library, etc.) corresponding to the search criteria or query.

In accordance with a preferred embodiment, class search module 310 is programmed to display search results from individual classifications separately, ordered in any preference designated by the user (e.g., date, alphabetical by title, inventor, assignee, relevancy, weighted relevancy, scoring formula, etc.). A user may alternatively request that class search module 310 present any two or more selected classifications as a simultaneous listing or single grouping of search results (ordered as desired), with removal of any duplicates arising from commonly classified documents or information.

Class search module 310 is programmed to permit a user to further define or otherwise edit the search criteria to refine or limit the search results. Other search criteria or queries performed by search engine 304 (or other modules) can be added to the stored search criteria (or at least searched in conjunction with the stored search criteria) to effectively narrow the focus of the search. Class search module 310 may retrieve the additional search criteria from stored search criteria (e.g., imported from a user's workspace) or otherwise receive the additional search criteria in the form of input data from user interface 35 (e.g., via keyboard). The additional search criteria may, for example, be additional keywords to be searched in an entire document or in select fields (e.g., detailed description only). Other known limitations (e.g., date restrictions) or search elements (e.g., Boolean logic operators) may be added to further refine the search criteria. The search criteria thus refined or edited may again be transmitted (and/or stored for later transmission) to database 32 (and/or remote systems) for execution on the entire database or only on a selected portion of the database (e.g., the previous search results, updated portions of the database, etc.).

Select documents, search results, and/or search criteria may be stored in a user's workspace in a manner similar to that described above in connection with search engine 304.

In accordance with a preferred embodiment of the invention, IP Thesaurus module 312 (FIG. 1) is provided to implement (alone or in conjunction with other modules) a variety of functions and operations related to the analysis and determination of elements of select intellectual property information (e.g., patents, trademarks, copyrights, mask works, trade secrets, etc.). Preferably, IP Thesaurus module 312 is programmed to receive input data or signals from a user (e.g., via user interface 35) identifying select intellectual property information to form or otherwise be designated as a source collection or grouping (hereinafter "source grouping") of intellectual property information. In accordance with a preferred embodiment, IP Thesaurus module 312 (directly, or indirectly) effectuates the retrieval and collection of the source grouping of intellectual property information into a memory unit (e.g., memory 302) that is accessible by IP Thesaurus module 312 (and/or SO server 30).

In accordance with a preferred embodiment, the select intellectual property information input by the user may be individual intellectual property (e.g., patents) identified by native indicia (e.g., list of patents identified by patent number, common assignee, date categories, etc.). The select intellectual property information may also be preexisting groupings such as intellectual property information previously identified in logical organizational constructs (e.g., folders in the user's workspace, saved search results, etc.) stored in a memory unit or system (e.g., memory unit 302, database 32, remote memory storage through network 37, etc.). IP Thesaurus module 312 thus may be programmed to receive input data from the user merely providing the identity or location of the underlying information (or even the underlying information itself) to facilitate retrieval and/or access to the select information.

In accordance with one commercial embodiment, for example, IP Thesaurus module 312 may be used in connection with an established classification system such as the classification system maintained by the U.S. Patent and Trademark Office for patent publications for searching patents, or the classification system for goods/services for searching trademarks. The source grouping, thus, in this exemplary embodiment may represent a field of search (e.g., patent search classes, subclasses, enumerated digests, etc.) of interest to the user.

Once the source grouping is retrieved (or at least accessible) for use by IP Thesaurus module 312, a review of the select intellectual property information in the source grouping is made (e.g., by IP Thesaurus module 312 itself or by/with other modules) to ascertain the different elements (e.g., words, textual phrases, concepts, representations, numbers, identifications, pictures, graphics, features, etc.) found in the source grouping, and generate a list thereof Where desired, the list thus generated may be stored for later use or immediately output to the user (e.g., via network 37 to user interface 35) for viewing, display or other use by the user (e.g., storing in a local/remote memory unit, printing, forwarding, etc.). Additional data related to the different elements derived from the source grouping may be statistically analyzed by IP Thesaurus module 312 (itself or by/with other modules) to produce useful information such as the frequency of occurrence of the different elements in the source grouping, as well as other information (e.g., frequency of occurrence in individual or subsets of documents, frequency of occurrence in segments or information fields of documents, associative relationships or patterns formed among different elements, etc.). The statistical data may be presented to the user, together with the list of elements derived. A list such as a word-frequency list, for example, may be created and displayed on a user interface: the list may present all of the different words found in a given source grouping, along with the frequency of occurrence of each listed word in the source grouping.

A user presented with a word-frequency list (or other useable output) from IP Thesaurus module 312 may use the list as an aid in learning a new technology, as a search tool to refine search queries or criteria, as a drafting tool to assist in the preparation of technical or legal documents (e.g., proposals, licenses, patent applications, etc.), or any other practical use. The outputs (e.g., lists of elements) from IP Thesaurus module 312 may be saved (locally, remotely, etc.) for subsequent use by one or more users.

In accordance with a preferred embodiment of the invention, individual elements (e.g., words, concepts, phrases, etc.) may be selected by one or more users at various times of use for storage in a master collection. Such a master collection facilitates the creation of dynamically evolving associative dictionaries, glossaries, thesauruses, or other knowledge bases of elements for intellectual property information, where individual elements (e.g., words) may be associated or otherwise linked with one or more related elements (e.g., synonyms, antonyms, homonyms, like structures, analogous patterns, pictures, concepts, phrases, meanings, etc.) derived from use of the IP Thesaurus module 312 on various source groupings.

Figure 4:
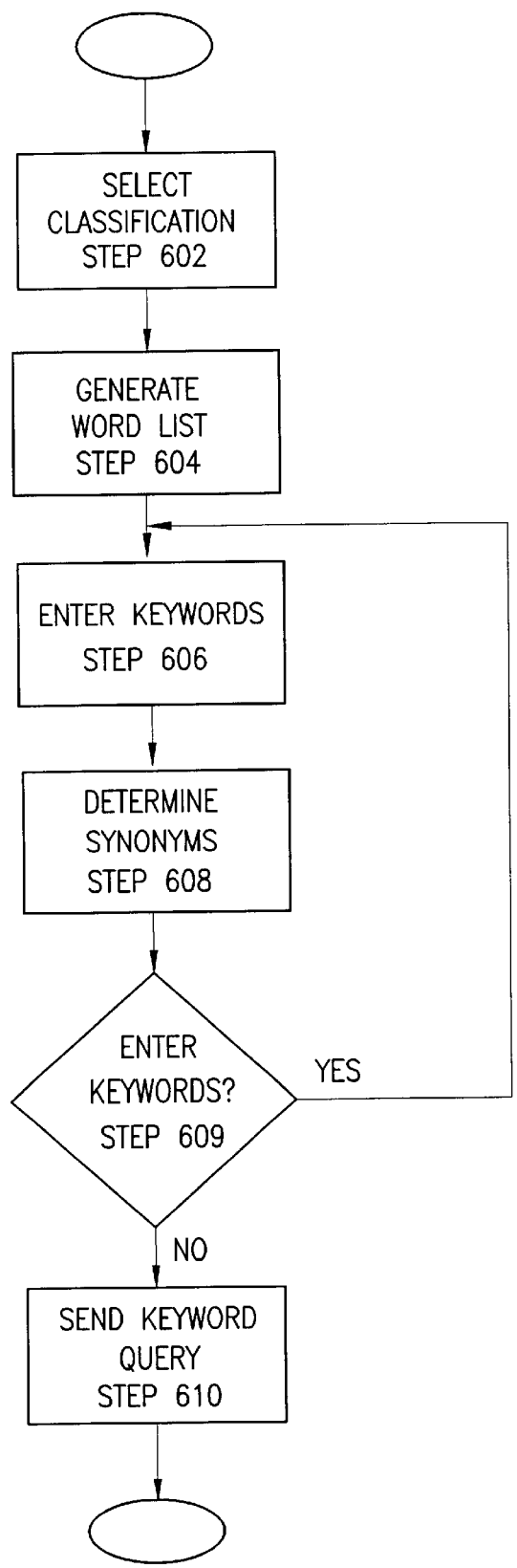
FIG. 4 illustrates an exemplary method of searching utilizing an IP thesaurus in accordance with a preferred embodiment of the invention.

A method derived from the use of the exemplary commercial embodiment described above is illustrated in FIG. 4. In accordance with this exemplary embodiment, a user (in step 602) selects one or more classifications (e.g., patent classes, subclasses, enumerated digests, etc.) to select desired intellectual property information (e.g., patent publications classified in the selected classes/subclasses) for review. The input signals received by IP Thesaurus module 312 (or other modules or systems implementing the method) designate the source grouping for retrieval (if necessary), access, and analysis to generate a list of words (or other elements) found in the selected information constituting the source grouping (step 604).

As used in a search system, input keywords (or other elements) are input or otherwise entered to form a search query or criteria (step 606). Preferably, the list of words (or other elements) is output for display simultaneously (or within access) with the display of the search criteria entered. Where a word-frequency list (or other statistically relevant information) is displayed with the search criteria, a user may determine that individual words (or other elements) on the list are synonyms (or otherwise related searchable elements) to keywords entered in the search criteria (step 608). The synonyms thus determined may be added manually (or automatically) to the search criteria to increase the robustness of any search employing the search criteria. The synonyms may be separately stored in an accrued synonym list as associated with one or more terms (or elements). The accrued synonym list can be added to or function as a dictionary, glossary, IP Thesaurus, or other authoring/analysis tool that can be displayed or accessed by a user during formation of search queries or criteria, or other uses.

A check to determine whether additional keywords are to be entered (step 609) is made, and the process repeated with any additional entered keywords (return to step 606). If no other keywords are to be entered, the keyword search query or criteria is sent (step 610) for output to one or more databases for execution (e.g., database 32, database 39, etc.).

Any number of uses may be made of the IP Thesaurus described herein. In accordance with a preferred embodiment, for example, IP Thesaurus module 312 (alone or in conjunction with other modules) may be programmed to formulate one or more libraries of IP Thesauruses so as to provide a host of different categories or classifications of different IP Thesauruses (or other lists or storage of different elements derived in the manner described above). The categories for the IP Thesauruses may be defined in any known manner (e.g., design or industry specific, devoted to different technical aspects, or other criteria). The library may include an IP Thesaurus for general mechanical terminology, for example, having as its components (or associatively related members) IP Thesauruses devoted to automobile engines in general with subcomponent lists (or thesauruses) for European engines and American engines. The IP Thesauruses may similarly be adapted to include (or dedicated for use with) foreign language terms found in selected intellectual property information. IP Thesaurus module 312 thus may be programmed to ascertain different foreign language elements (e.g., words, concepts, symbols, writings, etc.) for inclusion in one or more knowledge bases (e.g., thesauruses) of elements for intellectual property information.

In accordance with a preferred embodiment of the invention, Field-of-Search Module 314 (FIG. 1) is provided to implement (alone or in conjunction with other modules) a variety of functions and operations related to the determination of a field-of-search based on select intellectual property information (e.g., patents, trademarks, copyrights, mask works, trade secrets, etc.). Preferably, Field-of-Search Module 314 is programmed to receive input data or signals from a user (e.g., via user interface 35) identifying select intellectual property information to form or otherwise be designated as a source grouping of intellectual property information. In accordance with a preferred embodiment, Field-of-Search Module 314 (directly, or indirectly) effectuates the retrieval and collection of the source grouping of intellectual property information in the same or similar manner as that described above in connection with IP Thesaurus Module 312. Indeed, the same module(s) (e.g., IP Thesaurus Module 312, Field-of-Search Module 314, Search Engine 304, SO server 30, etc.) may be employed to produce the source grouping for either (or any disclosed) operation, and the same source grouping information may be used (simultaneously, subsequently, or periodically) by or with the various modules and devices disclosed herein. For this reason, no further detailed description of the selection, retrieval, access or other processing (e.g., use of Field-of-Search Module 314 in conjunction with a classification system) of a source grouping is needed.

Once the source grouping is retrieved (or at least accessible) for use by Field-of-Search Module 314, a review of the select intellectual property information in the source grouping is made (e.g., by Field-of-Search Module 314 itself or by/with other modules) to ascertain the different elements (e.g., words, textual phrases, concepts, representations, numbers, identifications, pictures, graphics, features, etc.)

found in the source grouping, and generate a list thereof that will constitute search information. Where desired, the list thus generated may be stored for later use or immediately output to the user (e.g., via network 37 to user interface 35) for viewing, display or other use by the user (e.g., storing in a local/remote memory unit, printing, forwarding, etc.). Additional data related to the different elements derived from the source grouping may be statistically analyzed by Field-of-Search Module 314 (itself or by/with other modules) to produce useful information such as the frequency of occurrence of the different elements or search information in the source grouping, as well as other information (e.g., frequency of occurrence in individual or subsets of documents, frequency of occurrence in segments or information fields of documents, associative relationships or patterns formed among different elements, etc.).

A user presented with a list of such search information (or other useable output) from Field-of-Search Module 314 may use the list as an aid in determining, preparing, formulating, or otherwise creating a field-of-search (or any other practical use). The outputs (e.g., lists of elements) from Field-of-Search Module 314 may be saved (locally, remotely, etc.) for subsequent use by one or more users. Field-of-Search Module 314 (and/or other modules) may be used to automatically determine or suggest a field-of-search based on the search information identified from one or more source groupings. Field-of-Search Module 314, for example, may be programmed to determine the frequency of occurrence or appearance of search information (e.g., classes and subclasses) found in select information fields (e.g., Field-of-Search, U.S. Classification, U.S. Cross-Reference Classification, References Cited, Forward Reference fields, etc.) of the intellectual property information in the source grouping. Based on the total frequency value of appearance of certain search information found in the source grouping being greater than a predetermined value, Field-of-Search Module 314 may automatically (or manually) create, add, or suggest such search information (e.g., classes and subclasses) for a field-of-search.

In accordance with an exemplary embodiment, one or more individual elements (e.g., words, concepts, phrases, etc.) may be selected from search information identified from a source grouping and used to indirectly ascertain a field-of-search. Field-of-Search Module 314, for example, may be programmed to access (alone or in conjunction with other modules) a local or remote database (or other system) containing information on the categories of classification in a given classification system. In an exemplary commercial embodiment, Field-of-Search Module 314 accesses a classification database (or other system) containing classification information in the form of the classification index, classification manual, and classification definitions for the U.S. Patent and Trademark Office classification system used to classify patents. Once accessed, Field-of-Search Module 314 can search for or otherwise associate the search information selected (e.g., words, concepts, phrases, etc.) with the classification information in the classification database to produce enumerated classifications (e.g., classes, subclasses, digests, etc.) that may correspond to the selected search information. Field-of-Search Module 314 may then utilize the enumerated classifications to create, add, or suggest a field-of-search, in the manner described above.

Figure 5:
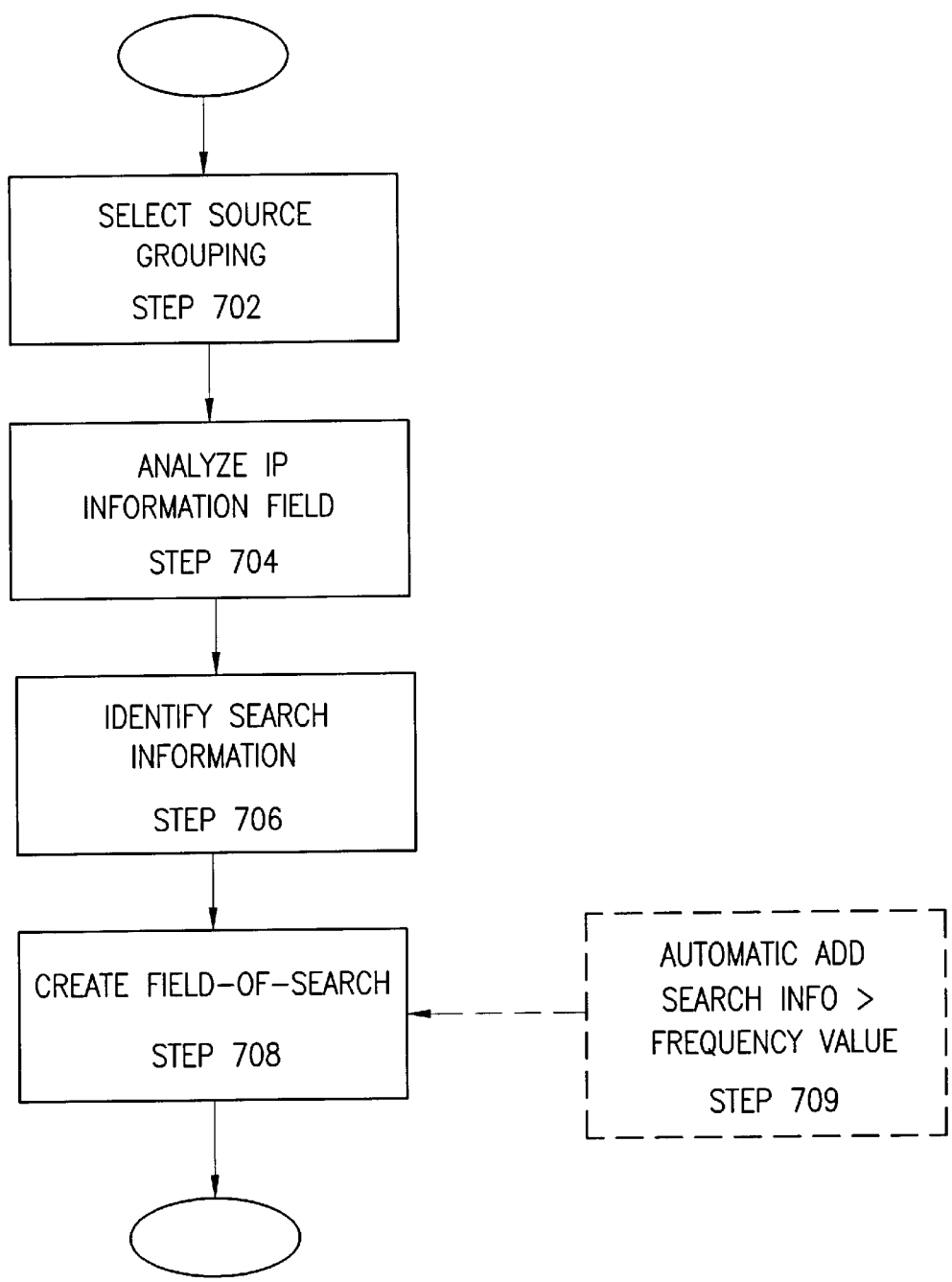
FIG. 5 illustrates an exemplary method of determining a field-of-search in accordance with a preferred embodiment of the invention.

One method that may be derived from the use of the embodiments described above is illustrated in FIG. 5. In accordance with this exemplary embodiment, a user (in step 702) selects one or more source groupings of intellectual property information (e.g., underlying intellectual property such as patents, trademarks, copyrights, mask works, trade secrets, etc.; lists of intellectual property such as search results; enumerated classifications of intellectual property such as patent classes/subclasses, etc.) to be sampled or otherwise used as a basis for determining a field-of-search that may be helpful to the user (e.g., in conducting a subsequent search for intellectual property). Based on the input signals received by Field-of-Search Module 314 (or other modules or systems implementing the method) selecting the source grouping, the selected source grouping is retrieved (if necessary), accessed, and analyzed for elements (e.g., numbers, classifications, words, concepts, phrases, etc.) in one or more informational fields of the intellectual property information constituting the source grouping (step 704). The elements detected or otherwise found in the informational fields are identified as search information (step 706). The search information may be displayed or otherwise output for viewing by the user to assist in the creation of a field-of-search (step 708). Where desired, the search information may be statistically analyzed for use in automatically generating, adding, or suggesting a field-of-search. As illustrated in FIG. 5, for example, search information that has a frequency of appearance in the selected source grouping that is greater than a predetermined frequency value may be automatically added to the field-of-search created (step 709). As used in a search system, as one example, the field-of-search thus created can form (or be part of) a search query or criteria to be executed by a local or remote database.

While preferred embodiments of the invention have been described and illustrated, it should be apparent that many modifications to the embodiments and implementations of the invention can be made without departing from the spirit or scope of the invention. For example, although the specific illustrations provided herein have pertained to intellectual property in the form of patents, it should be apparent to those of ordinary skill in the art that the invention may similarly be employed to store, search and organize information related to any form or combination of intellectual property (e.g., trademarks, copyrights, mask works, trade secrets, or other equivalent or related intellectual property such as certificates, registrations, etc.). While a client-server architecture has been specifically illustrated herein, the invention may easily be deployed in any form of network or communication technology. While the illustrated embodiments have not specified the type of communication medium (or protocol) used to connect the various modules (e.g., shown in FIG. 1), it should be apparent that any known wired/wireless technology may be used to implement the invention (e.g., Internet, intranets, private bulletin boards, individual local or wide area networks, proprietary chat rooms, ICQ, IRC channels, instant messaging systems, WAP, bluetooth, etc.) using real-time or non-real-time systems alone or in combination. The embodiments described in (or apparent from) the instant disclosure may be employed in standalone (or network linked) systems. The embodiments may similarly be implemented in other known systems and platforms (e.g., personal computer, Internet-based devices, PDAs, portable or hand-held electronic devices, etc.).

In accordance with a preferred embodiment, one or more user interfaces (e.g., user interface 15 (FIG. 1)) are provided as part of (or in conjunction with) the illustrated systems to permit users to interact with the systems. User interface devices may be any device used to input and/or output information. The user interface device may be implemented as a graphical user interface (GUI) containing a display or the like, or may be a link to other user input/output devices known in the art. Individual ones of a plurality of devices (e.g., network/stand-alone computers, personal digital assistants (PDAs), WebTV (or other Internet-only) terminals, set-top boxes, cellular/PCS phones, screenphones, pagers, kiosks, or other known (wired or wireless) communication devices, etc.) may similarly be used to execute one or more computer programs (e.g., universal Internet browser programs, dedicated interface programs, etc.) to allow users to interface with the systems in the manner described.

The modules described herein, particularly those illustrated or inherent in the instant disclosure, may be one or more hardware, software, or hybrid components residing in (or distributed among) one or more local or remote computer systems. Although the modules may be shown or described herein as physically separated components (e.g., search engine 304, workspace module 305, alert generator 306, etc.), it should be readily apparent that the modules as described herein may be merely logical constructs that are implemented as physical components combined or further separated into a variety of different components, sharing different resources (including processing units, memory, clock devices, software routines, etc.) as required for the particular implementation of the embodiments disclosed herein. Indeed, even a single general purpose computer (or other processor-controlled device) executing a program stored on an article of manufacture (e.g., recording medium or other memory units) to produce the functionality referred to herein may be utilized to implement the illustrated embodiments.

In addition, memory or database units described herein may be any one or more of the known storage devices or systems (e.g., Random Access Memory (RAM), Read Only Memory (ROM), hard disk drive (HDD), floppy drive, zip drive, compact disk-ROM, DVD, bubble memory, redundant array of independent disks (RAID), network accessible storage (NAS) systems, storage area network (SAN) systems, etc.), may also be one or more memory devices embedded within a CPU, or shared with one or more of the other components, and may be deployed locally or remotely relative to one or more components interacting with the memory or database units.

The illustrated embodiments have been described herein in connection with search systems and processes involving search criteria formulated from specific terms or textual phrases. It should be readily apparent, however, that the search criteria formulated may be implemented in any fashion known to those of ordinary skill in the art. The search criteria, for example, may be formulated as graphical or conceptual search criteria that allows for graphics-based or concept-based searches of intellectual property information as used by the different embodiments of the invention (e.g., Class Search, IP Thesaurus, Field-of-Search Determination, etc.). Although not specifically mentioned, it should be readily apparent that search engine 304 (and other modules) described herein as accessing database 32 (or other remote database systems) may further include or be used in conjunction with search technology (e.g., spiders, worms, bots, or other known devices) used to access information in remote database systems (or other memory unit) over any internal or external network (e.g., the Internet) to perform the various functions of retrieving, accessing, searching, etc. for stored information.

The illustrated embodiments have further been described in connection with user 35. It should be readily apparent that a "user" of the various aspects of the inventive systems or methods disclosed herein may be individuals, entities, devices, as well as peer/non-peer systems or technologies, and modules within the same device (e.g., SO server 30) or system without departing from the scope of the invention. The use of the "intellectual property information" and "source groupings" in the various embodiments described herein should be readily construed to include the underlying information constituting intellectual property information (e.g., patents, publications, etc.), as well as the numerical, textual, graphical or other indicia identifying the intellectual property information itself, or such indicia identifying the location where such intellectual property information may be retrieved, stored, accessed, located or otherwise found.

Accordingly, the invention is not to be limited by the foregoing description or drawings and only by the claims appended hereto.

What is claimed is:

1. A method of searching for intellectual property information utilizing an intellectual property classification system, the method comprising:

(A) defining search criteria by selecting at least one search classification containing intellectual property information to be searched, wherein the documents searched are in a data set including at least one of: at least a portion of a database of documents, an updated portion of the database, previous search results stored in a local memory, previous search results stored in a remote memory, previous search results stored in a workspace, and previous search results in at least one folder in the workspace;

(B) searching at least a portion of the documents based on the search criteria, wherein the search criteria are obtained from at least one of: input from the user, imported from the local memory, imported from the remote memory, imported from the workspace, and imported from the at least one folder in the workspace;

(C) providing search results, of the searching, wherein the results include a list of located documents corresponding to the search criteria, and a result item for at least one of the located documents includes a link to the at least one of the located documents and a link to at least one of a government storage of the document, a commercial storage of the document, and a physical address of the located document, and a reference to a subsequent history of the at least one of the located documents, wherein the subsequent history includes information representative of a plurality of: a pending re-examination, a completed re-examination, a reissue, an opposition, an arbitration, a litigation; and the result item includes a reference to a document in the subsequent history, including at least one of: a re-examination certificate, a file history, a complaint, and a notice; and (D) refining the search criteria, including selecting a different one of the data sets and performing a further search on the different one of the data sets, where the data set includes at least one of: the database, stored search results from a prior search; and including performing a further search on the different one of the data sets.

2. The method of claim 1, further comprising searching at least a portion of the documents based on the search criteria, where the search criteria further include at least one of: identification number, serial number, patent number, registration number, keyword, text, graphics;

where the search criteria are searched for in the documents in at least one of: an entire document, a field of the document, a segment of the document;

where the field is at least one of: publication number, publication date, title, inventor, assignee, application number, filing date, related data, priority data, international classification, US classification, cross reference classification, field of search, references cited, forward references citing document, examiner, agent, abstract, background, field of invention, summary, brief description of the drawings, detailed description, claims, drawings.

3. The method of claim 1, wherein there are a plurality of search criteria obtained from a user selected plurality of: input from the user, imported from the local memory, imported from the remote memory, imported from the workspace, and imported from the at least one folder in the workspace.

4. The method of claim 1, further comprising providing the results for at least one of storage and display.

5. The method of claim 4, wherein the results are in an order determined by at least one of: user-defined preferences, weighted relevancy, and scoring formula.

6. The method of claim 4, further comprising displaying a plurality of documents corresponding to at least a portion of the search results for simultaneous viewing on a same display.

7. The method of claim 1, further comprising storing the results, and information representative of the located documents.

8. The method of claim 1, wherein the workspace is allocated for use by at least one of: the user or a group of specified users including the user.

9. The method of claim 1, wherein the results, search criteria, and information representative of the located documents in the workspace are further stored in at least one folder of a plurality of folders in the workspace.

10. The method of claim 9, wherein the at least one folder includes user notes and identification data.

11. The method of claim 1, further comprising generating an alert, including accessing at least one stored search criteria upon at least one of a lapse of a predetermined time period and occurrence of an event; and updating the search results.

12. The method of claim 1, further comprising generating a report listing information representative of the search results, wherein the report is in the format of a template to be populated by the results, the search criteria, and information representative of the located documents for the search results.

13. The method of claim 12, wherein the template further includes specified content from at least one folder, at least one of the located documents and a segment of at least one of the located documents.

14. The method of claim 12, wherein the report is generated responsive to at least one of manual initiation, identified search results, a plurality of selected documents, and contents of at least one selected workspace folder.

15. The method of claim 1, further comprising performing a classification search including: presenting data representative of a classification system, and selecting the search criteria from the data representative of the classification system.

16. The method of claim 15, the data representative of the classification system including at least one of classification numbers, a classification index, classification headings, sub-classifications, classification definitions, and classification titles.

17. The method of claim 15, wherein the classification system is at least one of patent classification, trademark classification, and copyright classification.

18. The method of claim 15, wherein the data representative of the classification system further includes at least one of cross-reference classification, primary classification, secondary classification, current classification, and prior classification.

19. The method of claim 15, further comprising sorting the search results by classification.

20. The method of claim 1, further comprising receiving an identification of intellectual property information to be used as a source grouping, and the search criteria being derived from the source grouping.

21. The method of claim 20, further comprising determining a plurality of elements in the source grouping, and generating a list of the elements as candidate search criteria.

22. The method of claim 21, further comprising providing an analysis of the list of elements in the source grouping, the analysis including frequency of occurrence of elements in the documents, and wherein the elements are at least one of: a word, a phrase, a concept, a number, a picture, a feature, a representation, a graphic, and an identifier.

23. The method of claim 21, further comprising storing selected ones of the elements in the list of elements in a master collection of elements.

24. The method of claim 21, further comprising linking, responsive to the user, selected ones of the elements in the list of elements and storing information representative of a relationship between the selected ones of the elements.

25. The method of claim 24, wherein the relationship is at least one of: synonym, homonym, antonym, like, analogue, picture, concept, phrase, and meaning.

26. The method of claim 21, further comprising selecting at least one element in the list of elements to be included in the search criteria.

27. The method of claim 21, further comprising analyzing the frequency of occurrence of classification information in segments of documents having classification information, and suggesting a field of search by classifications based on the analysis.

28. The method of claim 27, further comprising selecting at least one element in the list of elements and associating the selected at least one element with at least one classification that corresponds thereto.

29. The method of claim 28, further comprising selecting the search criteria from the suggested field of search.

30. The method of claim 1, wherein the documents include text and images of at least one of: United States, foreign, international, treaty organization, multi-national intellectual property documents.

31. The method of claim 1, wherein the intellectual property is selected from at least one of patent, trademark, copyright, mask work, and trade secret.

32. The method of claim 1, wherein the documents include at least one of: issued patent, published patent application, statutory invention registration, abstract, technical publication, sequence listing, file history, government record, and public notice.

33. The method of 1, further comprising:
(E) generating an alert, including accessing at least one stored search results upon at least one of a lapse of a predetermined time period and occurrence of an event; and updating the search results; and
(F) generating a report listing information representative of the search results, wherein the report is in the format of a template to be populated by the results, the search criteria, and information representative of the located documents for the updated search results; wherein the report is generated responsive to at least one of manual initiation, identified search results, a plurality of selected documents, and contents of at least one selected workspace folder.

34. The method of 1, further comprising performing a classification search including: presenting data representative of a classification system, and selecting the search criteria from the data representative of the classification system, the data representative of the classification system including at least one of classification numbers, a classification index, classification headings, sub-classifications, classification definitions, and classification tides; and sorting the search results by classification.

35. The method of 1, further comprising performing a thesaurus search including receiving an identification of intellectual property information to be used as a source grouping, and selecting the search criteria derived from the source grouping; determining a plurality of elements in the source grouping, and generating a list of the elements as candidate search criteria; providing an analysis of the list of elements in the source grouping, the analysis including frequency of occurrence of elements in the documents, and wherein the elements are at least one of: a word, a phrase, a concept, a number, a picture, a feature, a representation, a graphic, and an identifier; and storing selected ones of the elements in a master collection of elements; wherein the elements are further grouped by semantic relationship.

36. The method of 1, further comprising performing a field-of-search including receiving an identification of intellectual property information to be used as a source grouping, and selecting the search criteria derived from the source grouping; determining a plurality of elements in the source grouping, and generating a list of the elements as candidate search criteria; providing an analysis of the list of elements in the source grouping, the analysis including frequency of occurrence of classification information in segments of documents having classification information, and associating at least one of the elements with at least one classification that corresponds thereto; and suggesting a field of search by classifications based on the analysis.

37. A search system for use with an intellectual property system, the search system comprising:

(A) a module to define search criteria by selecting at least one search classification containing intellectual property information to be searched, wherein the documents searched are in a data set including at least one of: at least a portion of a database of documents, an updated portion of the database, previous search results stored in a local memory, previous search results stored in a remote memory, previous search results stored in a workspace, and previous search results in at least one folder in the workspace;

(B) a module to provide search results including intellectual property information corresponding to search criteria; wherein the results include a list of located documents corresponding to the search criteria; and a result item for at least one of the located documents includes a link to the at least one of the located documents and a link to at least one of a government storage of the document, a commercial storage of the document, and a physical address of the located document, and a reference to a subsequent history of the at least one of the located documents, wherein the subsequent history includes information representative of a plurality of: a pending re-examination, a completed re-examination, a reissue, an opposition, an arbitration, a litigation; and the result item includes a reference to a document in the subsequent history, including at least one of: a re-examination certificate, a file history, a complaint, and a notice;

(C) a module to search at least a portion of the documents based on the search criteria, wherein the search criteria are obtained from at least one of: input from the user, imported from the local memory, imported from the remote memory, imported from the workspace, and imported from the at least one folder in the workspace; and (D) a module to refine the search criteria, including selecting a different one of the data sets and performing a further search on the different one of the data sets, where the data set includes at least one of; the database, stored search results from a prior search; and including performing a further search on the different one of the data sets.

38. The system of claim 37, further comprising a search module to search at least a portion of the documents based on the search criteria, where the search criteria further include at least one of: identification number, serial number, patent number, registration number, keyword, text, graphics;

where the search criteria are searched for in the documents in at least one of: an entire document, a field of the document, a segment of the document;

where the field is at least one of: publication number, publication date, title, inventor, assignee, application number, filing date, related data, priority data, international classification, US classification, cross reference classification, field of search, references cited, forward references citing document, examiner, agent, abstract, background, field of invention, summary, brief description of the drawings, detailed description, claims, drawings.

39. The system of claim 37, wherein there are a plurality of search criteria obtained from a user selected plurality of: input from the user, imported from the local memory, imported from the remote memory, imported from the workspace, and imported from the at least one folder in the workspace.

40. The system of claim 37, wherein the search results are provided for at least one of storage and display.

41. The system of claim 40, wherein the results are in an order determined by at least one of: user-defined preferences, weighted relevancy, and scoring formula.

42. The system of claim 4, wherein the display includes plurality of documents corresponding to at least a portion of the search results for simultaneous viewing on a same display.

43. The system of claim 37, wherein the search storage area further includes the results, and information representative of the located documents.

44. The system of claim 37, wherein the workspace is allocated for use by at least one of: the user or a group of specified users including the user.

45. The system of claim 37, wherein the results, search criteria, and information representative of the located documents in the workspace are further stored in at least one folder of a plurality of folders in the workspace.

46. The system of claim 45, wherein the at least one folder includes user notes and identification data.

47. The system of claim 37, further comprising a module to generate an alert, including accessing at least one stored search criteria upon at least one of a lapse of a predetermined time period and occurrence of an event; and updating the search results.

48. The system of claim 37, further comprising a module to generate a report for the search listing information representative of the search results, wherein the report is in the format of a template to be populated by the results, the search criteria, and information representative of the located documents for the search results.

49. The system of claim 48, wherein the template further includes specified content from at least one folder, at least one of the located documents and a segment of at least one of the located documents.

50. The system of claim 48, wherein the report is generated responsive to at least one of manual initiation, identified search results, a plurality of selected documents, and contents of at least one selected workspace folders.

51. The system of claim 48, wherein the search results are sorted by classification.

52. The system of claim 37, further comprising a module to perform a classification search including: presenting data representative of a classification system, and selecting the search criteria from the data representative of the classification system.

53. The system of claim 52, the data representative of the classification system including at least one of classification numbers, a classification index, classification headings, sub-classifications, classification definitions, and classification titles.

54. The system of claim 52, wherein the classification system is at least one of patent classification, trademark classification, and copyright classification.

55. The system of claim 52, wherein the data representative of the classification system further includes at least one of cross-reference classification, primary classification, secondary classification, current classification, and prior classification.

56. The system of claim 37, further comprising a module to perform a search including receiving an identification of intellectual property information to be used as a source grouping, and selecting the search criteria derived from the source grouping.

57. The system of claim 56, further comprising determining a plurality of elements in the source grouping, and generating a list of the elements as candidate search criteria.

58. The system of claim 57, further comprising an analysis of the list of elements in the source grouping, the analysis including frequency of occurrence of elements in the documents, and wherein the elements are at least one of: a word, a phrase, a concept, a number, a picture, a feature, a representation, a graphic, and an identifier.

59. The system of claim 57, wherein selected ones of the elements in the list of elements are stored in a master collection of elements.

60. The system of claim 57, further comprising linking, responsive to the user, selected ones of the elements in the list of elements and storing information representative of a relationship between the selected ones of the elements.

61. The system of claim 60, wherein the relationship is at least one of: synonym, homonym, antonym, like, analogue, picture, concept, phrase, and meaning.

62. The system of claim 57, further comprising at lease least one selected element in the list of elements to be included in the search criteria.

63. The system of claim 57, further comprising an analysis of the frequency of occurrence of classification information in segments of documents having classification information, and suggesting a field of search by classifications based on the analysis.

64. The system of claim 63, wherein at least one selected element in the list of elements is associated with at least one classification that corresponds thereto.

65. The system of claim 64, wherein the search criteria are selected from the suggested field of search.

66. The system of claim 37, wherein the documents include text and images of at least one of: United States, foreign, international, treaty organization, multi-national intellectual property documents.

67. The system of claim 37, wherein the intellectual property is selected from at least one of patent, trademark, copyright, mask work, and trade secret.

68. The system of claim 37, wherein the documents include at least one of: issued patent, published patent application, statutory invention registration, abstract, technical publication, sequence listing, file history, government record, and public notice.

69. The system of 67, further including a module to perform a classification search including presenting data representative of a classification system, and selecting the search criteria from the data representative of the classification system, the data representative of the classification system including at least one of classification numbers, a classification index, classification headings, sub-classifications, classification definitions, and classification titles; and sorting the search results by classification.

70. The system of 37, further comprising a module to perform a thesaurus search including receiving an identification of intellectual property information to be used as a source grouping, and selecting the search criteria derived from the source grouping; determining a plurality of elements in the source grouping, and generating a list of the elements as candidate search criteria; providing an analysis of the list of elements in the source grouping, the analysis including frequency of occurrence of elements in the documents, and wherein the elements are at least one of: a word, a phase, a concept, a number, a picture, a feature, a representation, a graphic, and an identifier; and storing selected ones of the elements in a master collection of elements; wherein the elements are further grouped by semantic relationship.

71. The system of 37, further comprising a module to perform a field-of-search including receiving an identification of intellectual property information to be used as a source grouping, and selecting the search criteria derived from the source grouping; determining a plurality of elements in the source grouping, and generating a list of the elements as candidate search criteria; providing an analysis of the list of elements in the source grouping, the analysis including frequency of occurrence of classification information in segments of documents having classification information, and associating at least one of the elements with at least one classification that corresponds thereto; and suggesting a field of search by classifications based on the analysis.

* * * * *

UNITED STATES PATENT AND TRADEMARK OFFICE
CERTIFICATE OF CORRECTION

PATENT NO. : 6,694,331 B2  
DATED : February 17, 2004  
INVENTOR(S) : Eugene M. Lee Page 1 of 2

It is certified that error appears in the above-identified patent and that said Letters Patent is hereby corrected as shown below:

Title page,
Item [56], References Cited, U.S. PATENT DOCUMENTS, please insert:

```
--2002/0069154A1    6/2002      Fields
  6,385,594         5/2002      Lebda et al.
  6,298,327         10/2001     Hunter et al.
  6,236,972         5/2001      Shkedy
  2001/0000044A1    3/2001      Lin
  6,195,646         2/2001      Grosh et al.
  6,115,690         9/2000      Wong
  6,049,811         4/2000      Petruzzi et al.
  6,029,141         2/2000      Bezos et al.
  5,995,947         11/1999     Fraser et al.
  5,991,751         11/1999     Rivette et al.
  5,895,468         4/1999      Whitmyer, Jr.
  5,819,092         10/1998     Ferguson et al.
  5,754,840         5/1998      Rivette et al.
  5,175,681         12/1992     Iwai et al.--

--FOREIGN PATENT DOCUMENTS
  JP 11134399 A     5/1999      Japan
  JP 11039394       2/1999      Japan
  JP 10171843 A     6/1998      Japan
  WO 9826343 A2     6/1998      WIPO--
```

OTHER PUBLICATIONS, please insert:

-- www.lloydwise.com, printed January 21, 2003.

Lasinski, M. and D. Davison, "Systems & Tools for Visualizing & Organizing IP Portfolios to Meet Business & Licensing Objectives", LES Annual Meeting, San Antonio, Texas, October 27, 1999, 10 sheets.

Lucas, Carl, "Visualization of Intellectual Property: Visualization Framework, Patent Maps, Patent Trees", LES Annual Meeting, San Antonio, Texas, October 27, 1999, 19 sheets.

Aureka 7.0: Open Platform for Intellectual Property Asset Management, materials distributed at 1999 LES Annual Meeting, San Antonio, Texas, October 24-27, 1999, 18 pages.

Pruzin, Daniel, "WIPO Outlines Nine-Point Agenda for Tackling IP Protection on Internet", *Electronic Commerce & Law Report*, Vol. 4, No. 36, BNA, September 22, 1999, pp. 849-850.

Tapling, Peter, Aurigin, Presentation at Licensing Executives Society Michigan Chapter Meeting, September 17, 1999, 32 pages.

Computer Packages, Inc., CPI Homepage, www.computerpackages.com, printed July 28, 1999, 14 pages Herhold, Scott, "Patent War Pending: Once-arcane field emerges as battleground between online start-ups and established companies", *San Jose Mercury News*, July 18, 1999 pp. 1-7.

Lovett, Wayne J., "Choosing the Right IP Software", *IP Worldwide*, March/April 1999 pp. 31-34.

Lovett, Wayne J., "Special Report: The New Essentials for Managing IP: Choosing the Right IP Software", *IP Worldwide*, March/April 1999, 11 pages.

Stephens, Keith, "Creating and Implementing the IP Plan", *IP Worldwide*, March/April 1999, pp. 35-37.

UNITED STATES PATENT AND TRADEMARK OFFICE
CERTIFICATE OF CORRECTION

PATENT NO. : 6,694,331 B2
DATED : February 17, 2004
INVENTOR(S) : Eugene M. Lee

It is certified that error appears in the above-identified patent and that said Letters Patent is hereby corrected as shown below:

Title page (cont'd),

Stephens, Keith, "Creating and Implementing the IP Plan", *IP Worldwide*, March/April 1999, 7 pages.

PCT-EASY (Electronic Application System) User Reference Manual, PCT-Easy Version 2.80, WIPO, Geneva, January 1999, 75 sheets.

Woodbridge, Richard C. and Paul A. Gardon, "Selecting an IP Docket Management System", *Intellectual Property Today*, January 1999, pp. 25-27.

www.lightlink.com/bbm, printed January 17, 1999.

PCT-Easy, User Reference Manual, PCT-EASY V 2.80, WIPO (www.wipo.int/), January 1999.

"Enabling the Virtual Enterprise: The Supply Chain Meets the Demand Chain", The Yankee Group,1998.

http://web.archive.org/web/19981206010357/www.inventnet.com, printed November 11, 1998, 10 pages.

www.inventnet.com, printed January 22, 2003, 5 pages.

Vollendorf, Stefanie, "IP Docketing Software—A Practical Tool", *Intellectual Property Today*, May 1998, pp. 54-56 and 58.

Dutton, Gail, "Protecting Intellectual Property", *Chemical Market Reporter*, March 23, 1998.

http://web.archive.org/web/19961219063059/http://www.inventnet.com, printed November 7, 1996, 14 pages.

www.inventnet.com, printed January 21, 2003, 11 pages.

Forstner, James A., "Managing international patent litigation", *Managing Intellectual Property Litigation Yearbook*, 1995, pp. 3-6.

Stallings, William Ph.D., "Computer Organization and Architecture", MacMillan Publishing Company, 1993, preface and contents, pp. iii – x.

Spohn, Darren L., "Data Network Design", McGraw-Hill, Inc., 1993, contents and preface, pp. vii – xxx.

Gitlin, Richard D., Jeremiah F. Hayes, and Stephen B. Weinstein, "Data Communications Principles", Plenum Press, 1992, preface and contents, pp. vii – xix.

Green, James Harry, "The Irwin Handbook of Telecommunications", Irwin Professional Publishing, 2d ed., 1992, preface and table of contents, pp. iii – xv.--

Signed and Sealed this

Twenty-fifth Day of January, 2005

JON W. DUDAS
*Director of the United States Patent and Trademark Office*